United States Patent
Kabe et al.

(10) Patent No.: US 6,295,112 B1
(45) Date of Patent: *Sep. 25, 2001

(54) METHOD FOR ALIGNING LIQUID CRYSTALS, ALIGNMENT DEVICE AND LIQUID CRYSTAL DISPLAY ELEMENT

(75) Inventors: Masaaki Kabe; Takashi Kaneko; Mitsuhiro Koden; Mitsuhiro Shigeta, all of Kashiwa; Nobuyuki Itoh, Noda, all of (JP)

(73) Assignees: Sharp Kabushiki Kaisha, Osaka (JP); The Secretary of State for Defense in her Britannic Majesty's Government of the United Kingdom of Great Britain and Northern Ireland, Hants (GB)

( * ) Notice: Subject to any disclaimer, the term of this patent is extended or adjusted under 35 U.S.C. 154(b) by 0 days.

This patent is subject to a terminal disclaimer.

(21) Appl. No.: 08/842,245

(22) Filed: Apr. 23, 1997

(30) Foreign Application Priority Data

Jul. 10, 1996 (JP) ...................................................... 8-180885

(51) Int. Cl.⁷ ............................ G02F 1/1337; G02F 1/141
(52) U.S. Cl. ............................ 349/126; 349/134; 349/133
(58) Field of Search ................................. 349/133, 134, 349/126

(56) References Cited

U.S. PATENT DOCUMENTS

| | | | |
|---|---|---|---|
| 5,133,922 | * 7/1992 | Kaeufer et al. | 264/280 |
| 5,147,682 | * 9/1992 | Takiguchi et al. | 427/58 |
| 5,200,108 | * 4/1993 | Yuasa et al. | 359/104 |
| 5,332,521 | * 7/1994 | Yuasa et al. | 252/299.61 |
| 5,422,748 | * 6/1995 | Kodera | 349/134 |
| 5,646,754 | * 7/1997 | Kodera | 349/134 |
| 5,850,272 | * 12/1998 | Kabe et al. | 349/126 |

FOREIGN PATENT DOCUMENTS

| | | |
|---|---|---|
| 0348939 | 3/1990 | (EP) . |
| 63121021 | 5/1988 | (JP) . |
| 64-55519 | * 3/1989 | (JP) . |
| 64-55520 | * 3/1989 | (JP) . |
| 7-86613 | 9/1995 | (JP) . |
| 8194225 | 7/1996 | (JP) . |

OTHER PUBLICATIONS

U.S. Patent Application Serial No. 08/810,549; filed on Mar. 3, 1997.

* cited by examiner

Primary Examiner—William L. Sikes
Assistant Examiner—Dung Nguyen
(74) Attorney, Agent, or Firm—Renner, Otto, Boisselle, Sklar (57) ABSTRACT

A method of aligning a liquid crystal includes a step of fixing on a hot plate and heating a liquid crystal cell in which a liquid crystal composed of a ferroelectric liquid crystal material sealed between electrode substrates respectively having alignment films having applied thereto a uniaxial alignment by rubbing. According to the described method, a pressure is applied to the liquid crystal cell by a roller, and a portion subjected to an application of pressure is moved by moving the roller. Further, the liquid crystal is heated within a temperature range between a phase transition temperature of SmA phase SmC* phase and a temperature 10° C. below the phase transition temperature, and the portion subjected to an application of pressure is moved in the same direction as the rubbing direction, thereby achieving the C2 orientation at higher yield. Within the described temperature range, by moving the portion in an opposite direction to the rubbing direction, a C2 orientation can be always achieved at high yield (almost 100%). As a result, the C2 orientation can be surely achieved in the liquid crystal display element with ease.

27 Claims, 6 Drawing Sheets

METHOD FOR ALIGNING LIQUID CRYSTALS, ALIGNMENT DEVICE AND LIQUID CRYSTAL DISPLAY ELEMENT

FIELD OF THE INVENTION

The present invention relates to a method for aligning liquid crystals, an alignment device and a liquid crystal display element, more particularly relates to a method for aligning liquid crystals suited for a liquid crystal element including a liquid crystal material having ferroelectricity, and an alignment device for use in such method and the liquid crystal display element.

BACKGROUND OF THE INVENTION

The ferroelectric liquid crystals were discovered by R. B. Meyer, et al., in 1975. At a later time, it was discovered by Clark and Lagerwall that by applying a horizontal alignment treatment and injecting a ferroelectric liquid crystal to be sealed within a cell formed with a cell gap of around 1 $\mu$m, a spiral structure of the ferroelectric liquid crystal disappeared. By the described discoveries, it became evident that the ferroelectric liquid crystal could be used as a display element. The described ferroelectric liquid crystal is known as a surface stabilized ferroelectric liquid crystal (SSFLC).

Initially, the ferroelectric liquid crystal was believed to be applicable to a display element without difficulties. However, after various researches and developments had been made, complicated structures and properties of the ferroelectric liquid crystal were found. In the meantime, the difficulties in controlling the display element became evident. With regard to such ferroelectric liquid crystal, the parameter to be focused was found to be a unique layered structure of a ferroelectric phase (SmC* phase).

Figure 7:
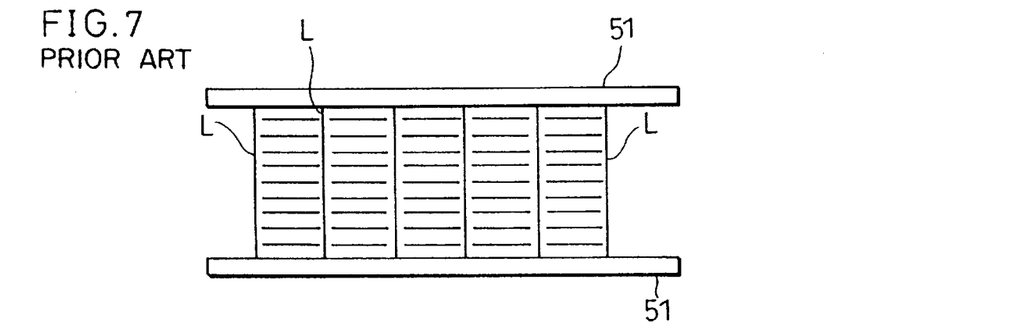
FIG. 7 is a cross-sectional view showing a layered structure of the ferroelectric liquid crystal in the surface stabilized ferroelectric liquid crystal cell considered in the initial stage of researches of the ferroelectric liquid crystal.
Figure 8:
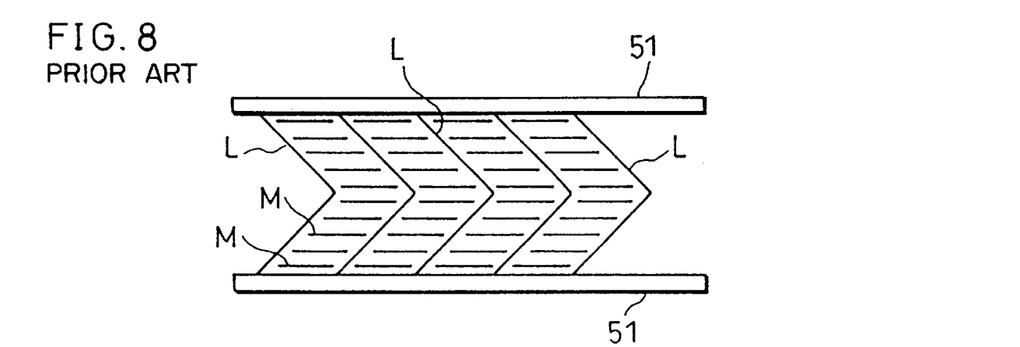
FIG. 8 is a cross-sectional view showing a layered structure of the ferroelectric liquid crystal in the surface stabilized ferroelectric liquid crystal cell.

As shown in FIG. 7, the ferroelectric liquid crystal was believed to have a "bookshelf structure" in which a layer L which constitutes the ferroelectric liquid crystal is formed perpendicular to the surface of substrates 51. However, after carrying out various researches, the ferroelectric liquid crystal was found to have a "Chevron structure" in which the layer L is bent at a central portion as shown in FIG. 8. Such layered structure resulted from compensating for a volume shrinkage occurred due to a tilt of a molecule M in the SmC* phase by the surface area of the layer L.

Figure 9:
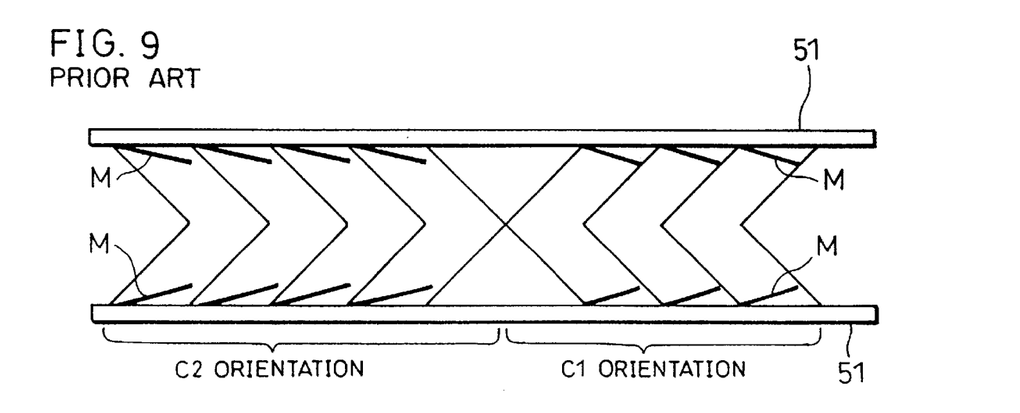
FIG. 9 is a cross-sectional view showing a surface-stabilized ferroelectric liquid crystal cell in which the C1 orientation and the C2 orientation are mixed.

Thereafter, it was found that the Chevron structure is basically associated with zig-zag defects which are often observed in the SSFLC element. Further, as shown in FIG. 9, it was found that by utilizing a pre-tilt in which the molecule M in a vicinity of the substrates 51 was tilted by a predetermined angle with respect to the substrates 51, a C1 orientation and a C2 orientation having different bending directions respectively of the layer L would appear as an alignment state.

In the case of adopting the ferroelectric liquid crystal for the display element, it is required to form a mono-domain by aligning liquid crystal molecules in a uniaxial direction in the entire display element. Known methods for such alignment include: a magnetic field alignment method, a temperature gradient method, a rubbing method, etc.

In the magnetic field alignment method, after heating the liquid crystal material to show an isotropic phase under an applied magnetic field, the liquid crystal is gradually cooled off to the liquid crystal phase. In the temperature gradient method, a liquid crystal phase is developed from the cut surface at a gradient temperature utilizing an alignment control force of the cut surface of a polymer spacer. In the rubbing treatment, the liquid crystal is aligned in a uniaxial direction by rubbing with cloth the alignment film in the uniaxial direction. This rubbing treatment is industrially the most effective.

When obtaining a mono-domain by re-aligning the display element which has been aligned by the known rubbing treatment, the method of gradually cooling off the display element which is heat treated until it shows an isotropic phase is generally adopted.

In the case of adopting the ferroelectric liquid crystal element, either one of the described C1 orientation and C2 orientation is adopted. This is because, when the described orientations of two kinds are mixed, zig-zag defects generate on the interface between them, which significantly lower the quality of the display element. Therefore, it is critical to control the C1 orientation and C2 orientation to attain an improved display quality. Additionally, as the C2 orientation has beneficial features of its stability at low temperature, and a short response time over the C1 orientation, the C2 orientation is more preferable than the C1 orientation.

Conventionally, to attain a uniform C2 orientation on an entire surface of the display element, the alignment is typically controlled by adjusting the combination of materials for a liquid crystal and an alignment film, or the rubbing conditions. The realignment is also typically achieved by adjusting the temperature or by the electric field treatment.

However, even if a liquid crystal material and an alignment film material showing desirable characteristics respectively are combined, if a combination thereof is not appropriate, the C2 orientation is hardly achieved by the alignment achieved by the rubbing method generally used. In such case, due to restrictions on an alignment, desirable properties of the materials for the liquid crystal and the alignment film cannot be fully appreciated.

As to the rubbing conditions, by increasing the rubbing strength, the C2 orientation appears. On the contrary, many scratches are formed on the display—element resulting from the strong rubbing treatment, thereby presenting the problem that the display quality suffers.

The re-alignment treatment does not enable a C2 orientation to always appear.

The described deficiencies of the conventional method have led to the need for development of a desirable method of forming a C2 orientation for sure on an entire surface of a display element without being affected by a combination of materials for a liquid crystal and an alignment film, rubbing conditions, etc.

SUMMARY OF THE INVENTION

Accordingly, it is an object of the present invention to provide a method for aligning liquid crystals that permits a C2 orientation to be always achieved with ease irrespectively of materials of a liquid crystal and an alignment film, or rubbing conditions.

The above object is accomplished by a method of aligning liquid crystals of the present invention designed for aligning a liquid crystal material of a liquid crystal display element, the liquid crystal material being sealed between a pair of light-transmissive substrates respectively having alignment films formed on surfaces thereof which face each other, the method including the step of locally applying a pressure to the liquid crystal material under an applied heat.

By applying both heat and pressure to the liquid crystal material simultaneously, in the liquid crystal element which has been cooled off after undergoing the described treatment, a C2 orientation appears at a portion subjected to an application of pressure. Therefore, it is preferable that the portion subjected to an application of pressure be moved so that the C2 orientation appears in an area where the portion subjected to an application of pressure of the liquid crystal material is moved.

Needless to mention, in the described process, it is required to set a pressure to be applied to the liquid crystal material so as not to destroy a layered structure thereof.

The appearance ratio of C2 orientation is affected by a moving direction of the portion subjected to an application of pressure. For example, in both the case (1) where the portion subjected to an application of pressure is moved in a direction of applying an alignment treatment to the alignment film, and the case (2) where the portion subjected to an application of pressure is moved in an opposite direction to the direction of the alignment treatment applied to the alignment film, the C2 orientation can be achieved at high yield at predetermined heating temperature. Here, the condition of the case (2) is more preferable than the case (1) as the higher appearance ratio of C2 orientation under an applied heat can be achieved as compared to the case (1).

In both cases where a portion subjected to an application of pressure is moved and the case where the portion subjected to an application of pressure is not moved as the liquid crystal material shows ferroelectricity, the C2 orientation surely appears in the ferroelectric liquid crystal display element. Moreover, in the case (2), it is preferable that a SmC* phase liquid crystal material which shows a SmC* phase be adopted as a liquid crystal material, and the SmC* phase liquid crystal material be heated within a predetermined temperature range, as such condition would offer the appearance ratio of the C2 orientation of 100 percent or almost 100 percent. The described temperature range is defined to be a range of from a temperature 10° C. below a transition temperature, at which a transition in phase occurs from the SmA phase to the SmC* phase, to the transition temperature.

As the ferroelectric phase appears at high temperature region than the antiferroelectric phase, even in the case where the liquid crystal material shows an antiferroelectricity, the C2 orientation can be achieved at high yield.

The described object is accomplished by a liquid crystal alignment device of the present invention which includes a heater for heating the liquid crystal material of a liquid crystal display element including a liquid crystal material sealed between a pair of light transmissive substrates respectively having alignment films formed on surfaces thereof which face each other and a pressurizer for locally applying a pressure to the liquid crystal material under an applied heat by the heater.

When the liquid crystal display element is cooled off after undergoing treatments by the heater and the pressurizer, a C2 orientation appears in a portion subjected to an application of pressure. Therefore, it is preferable that the liquid crystal alignment device further include a moving mechanism for moving the portion subjected to an application of pressure, whereby the C2 orientation appears in an area the portion subjected to an application of pressure of the liquid crystal material is moved as achieved by the described liquid crystal alignment method.

It is further preferable that the moving mechanism be moved in the same or opposite direction as or to the direction of the alignment applied, as such condition always permits the C2 orientation to be achieved at high yield under an applied heat to a predetermined temperature. When the described two cases are compared at the same heating temperature, the latter case where the portion subjected to an application of pressure is moved in an opposite direction to the direction of an alignment treatment offers the C2 orientation at higher yield as described earlier.

Moreover, in the case where the portion subjected to an application of pressure is moved in an opposite direction to the direction of an alignment by the moving mechanism, it is preferable that the moving means using a ferroelectric liquid crystal material which shows the SmC* phase be adopted. In this case, by limiting the heating temperature of the ferroelectric liquid crystal material, the C2 orientation can be achieved at higher yield. To be more specific, the ferroelectric liquid crystal material is heated within a range of from a temperature 10° C. below a phase transition temperature at which a transition in phase occurs from the SmA phase to the SmC* phase, to the phase transition temperature, whereby the C2 orientation appears in the liquid crystal material under an applied heat to the described temperature range at 100% or almost at 100%

The described object is accomplished by the liquid crystal display element of the present invention which includes a pair of light transmissive substrates having alignment films formed on respective surfaces which face each other, and a liquid crystal material sealed between light transmissive substrates, to which a pressure is locally applied under an applied heat.

The described arrangement where both heat and pressure are applied to the liquid crystal material at the same time permits the C2 orientation to be achieved in the portion subjected to an application of pressure. Therefore, it is preferable that the liquid crystal material be processed while moving the portion subjected to an application of pressure, whereby the C2 orientation appears in the moving range of the portion subjected to an application of pressure. It is further preferable that the portion subjected to an application of pressure of the liquid crystal material be moved in the same direction or opposite direction as or to the direction of the alignment. In the described liquid crystal material, the C2 orientation always appears under an applied heat to a predetermined temperature at high yield. When the described two cases are compared at the same heating temperature, the latter case where the portion subjected to an application of pressure is moved in an opposite direction to the direction of an alignment permits the C2 orientation to be achieved at higher yield as described earlier.

Both in the case where the heat treatment is applied while moving the portion subjected to an application of pressure, and the case where it is applied without moving the portion subjected to an application of pressure, it is preferable that the liquid crystal display element which shows the ferroelectricity be adopted, as such condition permits the C2 orientation to be always achieved in the liquid crystal display element having the ferroelectricity.

Furthermore, in the case of adopting the liquid crystal display element to which a pressure is applied while moving the portion subjected to an application of pressure in the opposite direction to the alignment, it is preferable that the heating temperature be set within a range of from a temperature 10° C. below a phase transition temperature, at which a transition in phase occurs from the SmA phase to the SmC* phase, to the phase transition temperature, whereby the appearance ratio of the C2 orientation of 100% or almost 100% can be achieved.

For a fuller understanding of the nature and advantages of the invention, reference should be made to the ensuing detailed description taken in conjunction with the accompanying drawings.

DESCRIPTION OF THE EMBODIMENTS

The following descriptions will explain one embodiment of the present invention in reference to FIG. 1 through FIG. 6.

Figure 2:
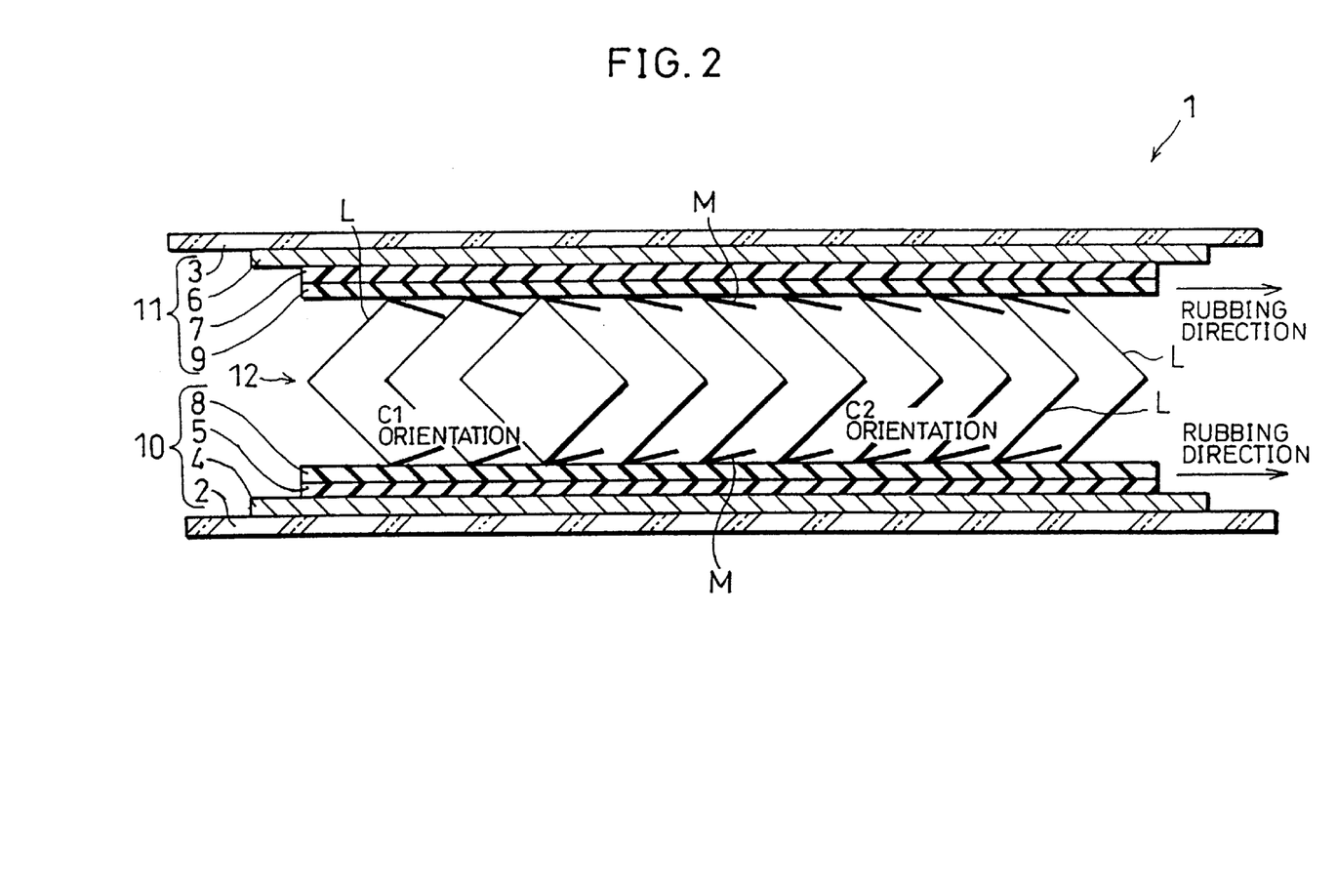
FIG. 2 is a cross-sectional view showing a structure of a liquid crystal cell aligned by the method for aligning liquid crystals of FIG. 1.

As shown in FIG. 2, a liquid crystal display element (liquid crystal cell 1) in accordance with the present embodiment includes two glass substrates 2 and 3 which face each other. The material for the substrates 2 and 3 are not limited to glass, and, for example, light-transmissive and insulating resin substrates may be adopted.

On the surface of the glass substrate 2, a light transmissive electrode film 4 made of, for example, indium tin oxide (hereinafter referred to as ITO) is formed in a predetermined pattern. Further, a light transmissive insulating film 5 made of, for example, $SiO_2$ is laminated thereon. On the other hand, on the glass substrate 3, an electrode film 6 made of the same material as the electrode film 4 is formed in a predetermined pattern. Further, a light transmissive insulating film 7 made of the same material as the insulating film 5 is laminated thereon.

On the insulating films 5 and 7, alignment films 8 and 9 which are uniaxially aligned by rubbing are formed. Here, the alignment films 8 and 9 are rubbed (aligned) in the same direction as the surfaces thereof. For such alignment films 8 and 9, organic polymers such as polyimide, nylon and polyvinyl alcohol, etc., may be adopted.

As described, an electrode substrate 10 is formed by the glass substrate 2, the electrode film 4, the insulating film 5 and the alignment film 8, while an electrode substrate 11 is formed by the glass substrate 3, the electrode film 6, the insulating film 7 and the alignment film 9.

The electrode substrates 10 and 11 are laminated with a predetermined interval (cell gap) by a sealing agent (not shown). A liquid crystal (liquid crystal material) 12 which shows a ferroelectricity is sealed between the electrode substrates 10 and 11 so as to come in contact with the alignment films 8 and 9 which face each other by the sealing agent. The molecule M in the vicinity of the electrode substrates 10 and 11 in the layer L which constitutes the liquid crystal 12 is tilted by a predetermined angle with respect to the electrode substrates 10 and 11 due to the alignment control force (anchoring) of the alignment films 8 and 9.

Figure 1:
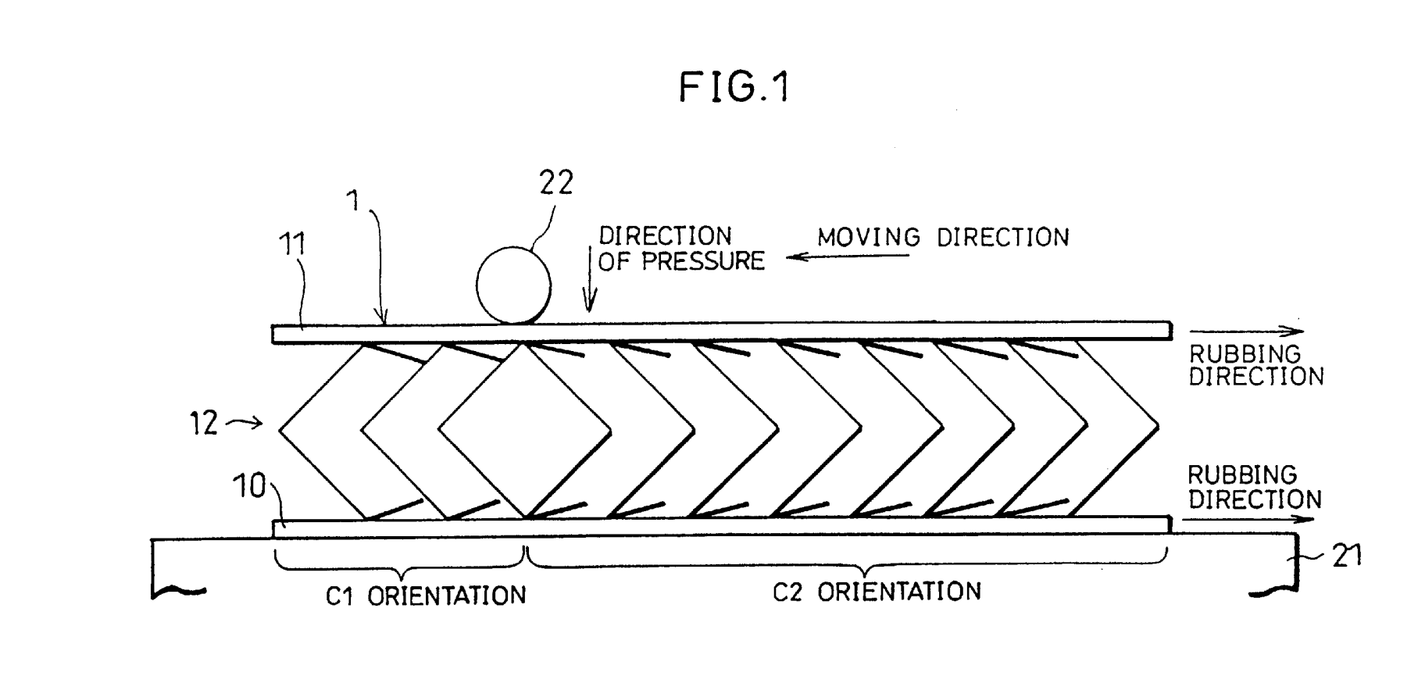
FIG. 1 is a cross-sectional view showing one structure which explains a method for aligning liquid crystals in accordance with one embodiment of the present invention.

With respect to the liquid crystal cell 1 having the described arrangement, the following heat and pressure treatments are applied. As shown in FIG. 1, while heating the liquid crystal cell 1 fixed on a horizontal surface of a hot plate 21 serving as heat application means (heater), a pressure is locally applied to the liquid crystal cell 1 by a roller 22 serving as pressure application means (pressurizer) in such a manner that the layered structure of the liquid crystal 12 is not damaged, whereby the portion subjected an application of pressure is moved in a horizontal direction (moving direction). In the described process, the heating temperature is set within a range of from a temperature 10° C. below a transition temperature, at which a transition in phase occurs in the liquid crystals 12 (ferroelectric liquid crystal material) from a SmA phase to a SmC* phase, to the phase transition temperature, and the roller 22 having sufficient size and weight for applying appropriate pressure is adopted.

Here, instead of moving the portion subjected to an application of pressure by moving the roller 22, it may be arranged so as to move the liquid crystal cell 1 together with the hot plate 21 while fixing the roller 22. Here, the moving direction of the portion subjected to an application of pressure is in an opposite direction to the rubbing direction. In the present embodiment, a pressure to be applied to the liquid crystal cell 1 is set to 0.5 $Kg/cm^2$. However, for the liquid crystal cell 1 having a structure of high impact resistance, the pressure may be increased.

Figure 3:
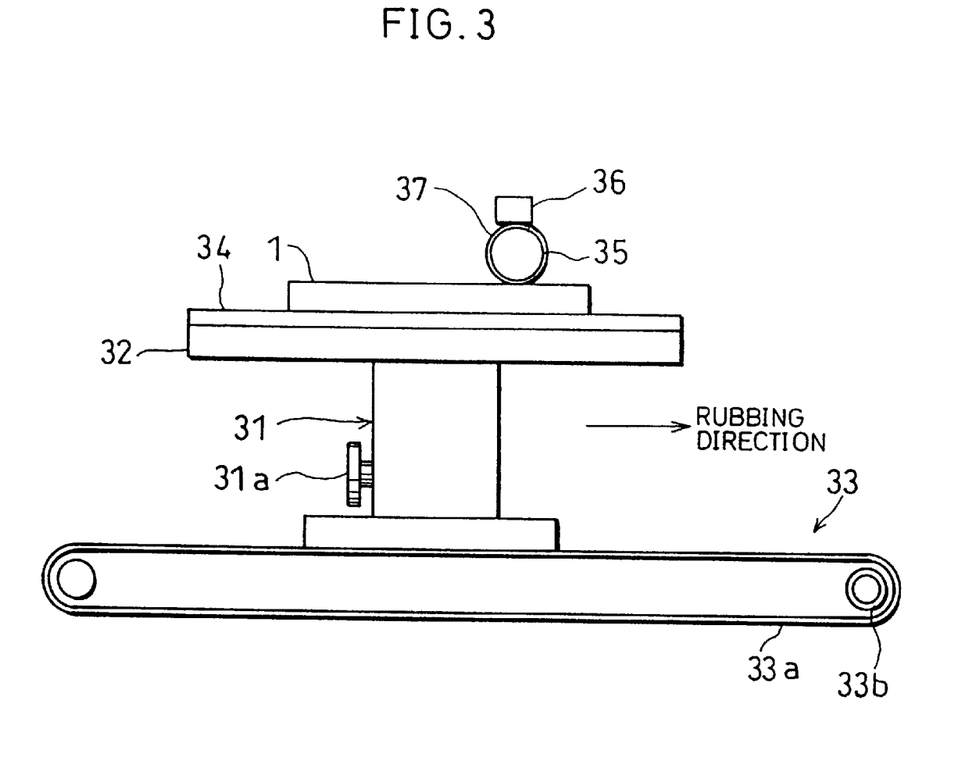
FIG. 3 is a front view showing a schematic structure of a device which permits the method for aligning liquid crystals of FIG. 1 to be carried out.

Another device of performing the same heat and pressure treatments as the devices shown in FIG. 1 is arranged as shown in FIG. 3. The device shown in FIG. 3 includes a Z stage 31, a stage 32, a moving unit 33 and a rubber heater 34, a roller 35 and a cooling system 36.

The Z stage 31 is provided at the center of the lower surface of the stage 32 which can be moved up and down by operating a handle 31a. Additionally, in the device of the present invention, four Z stages 31 are provided at four corners on the lower surface of the stage 32. The described arrangement is still more preferable in that the upper surface of the stage 32 can be horizontally adjusted.

The moving device 33 serving as moving means (moving mechanism) is a device for moving the Z stage 31 in a horizontal direction and has an endless belt 33a and a motor 33b. The Z stage 31 is fixed onto the belt 33a and is moved using the belt 33a which is moved using a drive force received from the motor 33b. The stage 32 is a plate for placing thereon the liquid crystal cell 1, which is made of stainless. The stage 32 is formed wider than the liquid crystal cell 1 and has a sufficient strength against pressure applied by the roller 35. The material for the stage 32 is not particularly limited, and any material having sufficient strength against the heat applied by the rubber heater 34 and the pressure applied by the roller 35 may be adopted.

The rubber heater 34 serving as heat application means is a heater for applying heat to the liquid crystal cell 1, and is formed so as to cover the upper surface of the stage 32. The rubber heater 34 is a plane-shaped heater having a heating wire which is two-dimensionally wired and a rubber which covers the heating wire.

The roller 35 serving as pressure application means (pressurizer) is arranged so as to locally apply pressure to the liquid crystal cell 1. The roller 35 is fixed at a predetermined height position or mounted at a predetermined height position so as to be freely movable. The roller 35 may or may not be rotatable.

Furthermore, the roller 35 is made of stainless in a cylindrical shape (diameter: 7.5 cm, and length: 25 cm). Additionally, a protective film 37 is formed so as to surround the roller 35 to prevent the liquid crystal cell 1 from scratching.

As long as a predetermined pressure can be locally applied to the liquid crystal cell 1, the shape and material of the roller 35 are not particularly limited.

The length of the roller 35 in the lengthwise direction is selected to be longer than the length between both ends of the display area of the liquid crystal cell 1 and is shorter than the length between both ends of the liquid crystal cell 1. The length of the roller 35 is defined in the described range in consideration of the fact that the flange of the liquid crystal cell 1 has fine protrusions and recessions formed in the manufacturing process of the liquid crystal cell 1, to prevent the problem that the pressure cannot be applied uniformly to the liquid crystal cell 1 due to the roller 35 coming in contact with the protrusions and recessions.

Figure 4:
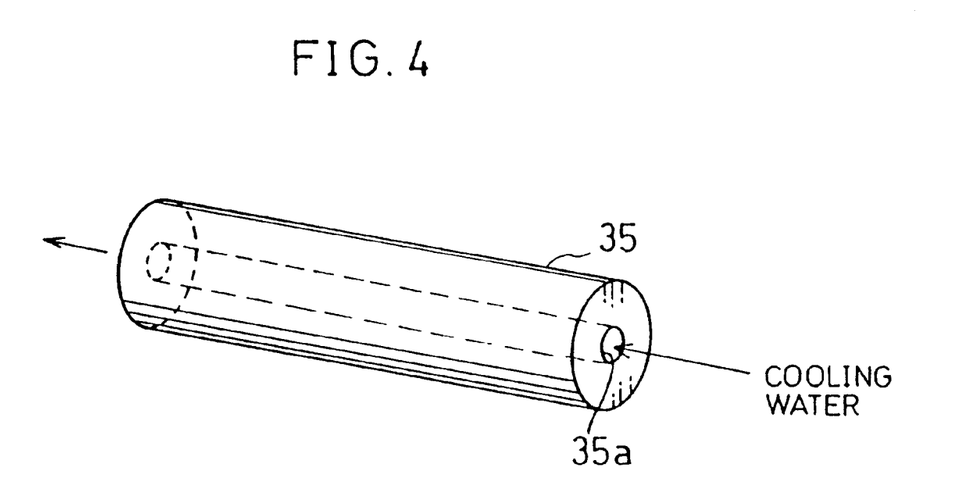
FIG. 4 is a perspective view showing a method of cooling off a roller for applying a pressure onto the liquid crystal cell in the device of FIG. 3.

The cooling system 36 is provided in a vicinity of the roller 35 so as to prevent the roller 35 from being distorted due to a heat from the liquid crystal cell 1, and has a cooling function by water or air. For the water cooling system 36, for example, the structure shown in FIG. 4 is adopted. In the structure, cooling water is supplied to a hollow space 35a which penetrates both ends of the roller 35 by a nozzle (not shown).

In the described device, the Z stage 31, the stage 32 and the rubber heater 34 are arranged so as to move in the rubbing direction shown by an arrow at a constant rate by the moving device 33. This means that the moving direction of the portion subjected to an application of pressure is in an opposite direction to the rubbing direction. Here, instead of moving the Z stage 31, the stage 32 and the rubber heater 34, it may be arranged so as to move the roller 35 by other moving devices (not shown) In this case, as the roller 35 is moved in an opposite direction to the rubbing direction, the moving direction of the portion subjected to an application of pressure is in an opposite direction to the rubbing direction.

As described, in the described device, by moving the roller 35 or other member than the roller 35, the portion subjected to an application of pressure of the liquid crystal cell 1 by the roller 35 is moved.

In the described device, by rotating the handle 31a in a normal direction or reversed direction, the stage 32 can be moved up and down. With the described vertical movement of the stage 32, as a contacting state of the roller 35 and the liquid crystal cell 1 varies, the pressure to be applied to the liquid crystal cell 1 can be optimally adjusted.

As described, with respect to the liquid crystal cell 1 which has been aligned by rubbing, a realignment treatment is applied under applied heat and pressure, whereby the C2 orientation can be always achieved with ease. Furthermore, as will be explained in the below-discussed examples of the present invention, by optimally adjusting the moving direction of the portion subjected to an application of pressure and the heating temperature, the C2 orientation can be achieved in an entire surface of the liquid crystal cell 1, thereby obtaining a desirable liquid crystal display element without defects. As a result, an improved display quality of the liquid crystal display element can be achieved.

Additionally, as the ferroelectric phase appears at higher temperature region than the anti-ferroelectric phase, by arranging the alignment in the ferroelectric phase in the C2 orientation, even if the liquid crystal phase shows the anti-ferroelectric phase due to a drop in temperature, a uniform state of the C2 orientation can be maintained. Therefore, the C2 orientation can be achieved on the entire surface of the liquid crystal cell as in the case of adopting the ferroelectric liquid crystal.

The following will explain the preferred embodiment of the present invention in detail.

LIQUID CELL PREPARATION EXAMPLE 1

A liquid crystal cell 1 adopted in the present embodiment is prepared in the following manner.

First, electrode films 4 and 6 are respectively formed on a pair of glass substrates 2 and 3 so as to have a thickness of 1,000 Å. Further, on the electrode films 4 and 6, insulating films 5 and 7 are respectively formed so as to have a thickness of 1,200 Å. The insulating films 5 and 7 are formed in the following manner: After forming films of a solvent of A-2014 (available from Nissan Chemical Industries, Co., Ltd.), i.e., a $SiO_2$ series material, on the electrode films 4 and 6 by the spin coating method, the film is baked for 90 minutes at 200 ° C.

On the insulating films 5 and 7, the alignment films 8 and 9 are formed so as to have a thickness of 490 Å. In forming the alignment films 8 and 9, after forming films of a solvent SE-7792 (available from Nissan Chemical Industries, Co. Ltd.), i.e., polyamide carboxylic acid (polyamic acid), on the insulating films 5 and 7 by the spin coating method, the films are baked for 90 minutes at 180 ° C. The electrode substrates 10 and 11 of this example are formed in the described manner.

Next, the rubbing treatment is applied to the electrode substrates 10 and 11 under the following conditions:

Diameter of Rubbing Roller: 150 mm
Number of Revolutions per Minute of Rubbing Roller: 500 rpm
Moving Rate of Stage: 10 mm/s
Number of Repeated Times of Rubbing: 3times
Depth of Deformed Regions of Rubbing Cloth: 0.2 mm.

Further, the electrode substrates 10 and 11 are laminated in such a manner that respective rubbing directions are identical, and the liquid crystal 12 is sealed in a space formed by the electrode substrates 10 and 11 and the described sealing agent, thereby forming the liquid crystal cell 1 (parallel rubbing cell) shown in FIG. 2. The described cell gap of the liquid crystal cell 1 is set in a range of from 1.0 to 1.5 µm. For the liquid crystal 12 to be sealed in the liquid crystal cell 1, a ferroelectric liquid crystal material (hereinafter simply referred to as a liquid crystal material) which shows the following phase transition temperature is adopted:

The described liquid crystal cell 1 is fixed onto the rubber heater 34 in the described device, and the liquid crystal cell 1 is heated by the rubber heater 34 so that the liquid crystal 12 is heated to 70° C.

By adjusting the height position of the Z stage 31, a pressure is applied to the liquid crystal cell 1 by the roller 35 in such a manner that the alignment of the liquid crystal cell 1 is not damaged. When completing an application of pressure, the application of heat is stopped simultaneously to cool off the liquid crystal cell 1. In the present embodiment, a pressure is applied only to a specific portion of the liquid crystal cell 1 so that the portion subjected to an application of pressure is not moved.

As a result, the C2 orientation appears in the portion subjected to an application of pressure in the liquid crystal cell 12.

LIQUID CRYSTAL CELL PREPARATION EXAMPLE 2

In the this example, heat and pressure are applied to a liquid crystal cell 1 in the same manner as example 1, and a Z stage 31, a stage 32 and a rubber heater 34 as well as the liquid crystal cell 1 are moved in a rubbing direction at a moving rate of 3 mm/s as shown in FIG. 3. Here, the moving direction is an opposite direction to the rubbing direction.

As a result, a C2 orientation appears in an entire portion subjected to an application of pressure of the liquid crystal cell 1.

LIQUID CRYSTAL CELL PREPARATION EXAMPLE 3

In the present embodiment, heat and pressure are applied to a liquid crystal cell 1 in the same manner as example 1. Further, the liquid crystal cell 1 is moved in the same manner as example 2 using the device shown in FIG. 3. However, the moving direction of the liquid crystal cell 1 differs from that of the example 2.

First, in the case of moving the liquid crystal cell 1 in an opposite direction to that of example 2, so that the portion subjected to an application of pressure is moved in a rubbing direction, the C2 orientation appears in 95 percent of the portion subjected to an application of pressure of the liquid crystal cell 1. Also in the case of moving the liquid crystal cell 1 so that the portion subjected to an application of pressure is moved into two directions perpendicular to the rubbing direction within a horizontal plane, the C2 orientation appears in 95 percent of the portion subjected to an application of pressure of the liquid crystal cell 1.

As can be seen, when comparing the results with the results of Example 2, the following condition is found to be the most preferable. That is, the moving direction of the portion subjected to an application of pressure is moved in an opposite direction to the rubbing direction.

LIQUID CRYSTAL CELL PREPARATION EXAMPLE 4

In the present example, a pressure is applied in the same manner as Example 2 except for the heating temperature of the liquid crystal cell 1.

Figure 5:
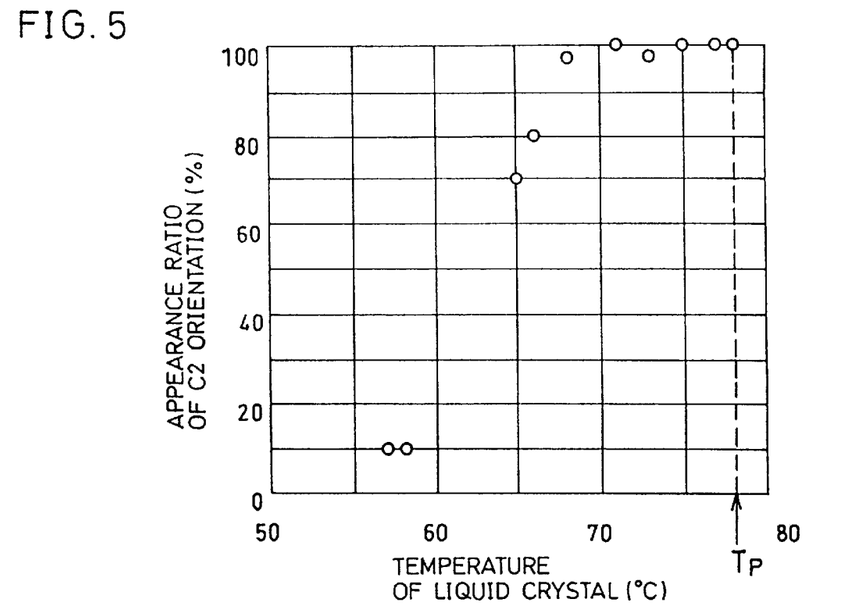
FIG. 5 is a graph showing results of measurement in example 4 in which the method for aligning liquid crystals is exemplified with respect to a change in the appearance ratio of C2 orientation against the temperature of liquid crystals.

As a result, the appearance ratio of the C2 orientation of the liquid crystal cell 1 varies in accordance with a change in temperature of the liquid crystal 12 as shown in Table 1 and FIG. 5. In FIG. 5, $T_p$ indicates a temperature of the liquid crystal 12, at which a transition in phase occurs in the liquid crystal material adopted in example 1 from the SmA phase to the SmC* phase.

TABLE 1

| TEMPERATURE OF LIQUID CRYSTAL (° C.) | APPEARANCE RATIO OF C2 ORIENTATION (%) |
|---|---|
| 78.000 | 100.000 |
| 77.000 | 100.000 |
| 75.000 | 100.000 |
| 73.000 | 98.000 |
| 71.000 | 100.000 |
| 68.000 | 98.000 |
| 66.000 | 80.000 |
| 65.000 | 70.000 |
| 58.000 | 10.000 |
| 57.000 | 10.000 |

As can be seen, by heat-treating the liquid crystal cell 1 such that the temperature of the liquid crystal 12 is heated within a range of from a temperature $T_p$ (78° C.) to a temperature (68° C.) 10° C. below $T_p$, the C2 orientation can be achieved at 100 percent or almost at 100 percent.

LIQUID CRYSTAL CELL PREPARATION EXAMPLE 5

A liquid crystal cell 1 adopted in the present embodiment is prepared in the described manner, and a liquid crystal material which shows the following phase transition temperature is sealed therein as a liquid crystal 12:

With respect to the liquid crystal cell 1 formed in the described manner, pressure application treatment is applied in the same manner as example 2 except for the heating temperature of the liquid crystal material 1.

Figure 6:
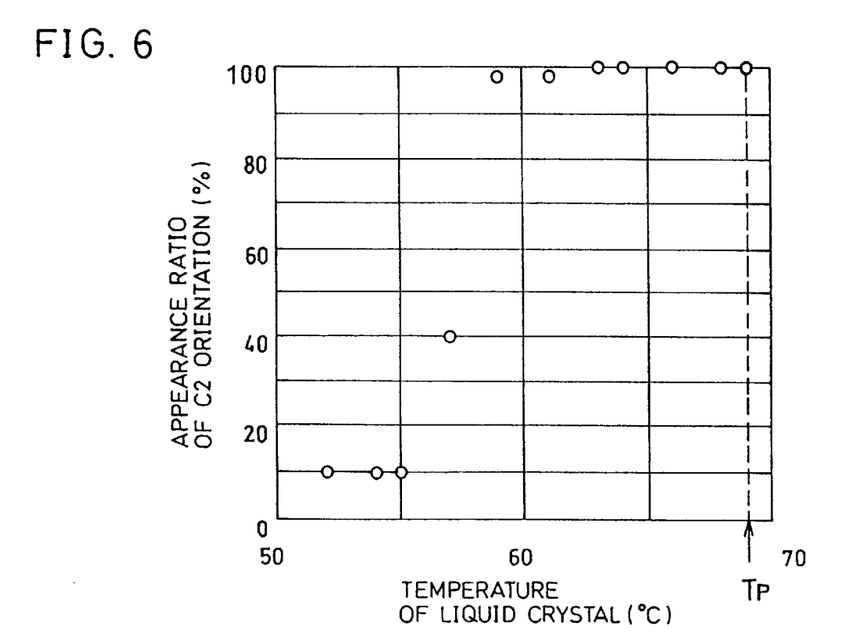
FIG. 6 is a graph showing results of measurement in example 5 in which the method for aligning liquid crystals is exemplified with respect to a change in the appearance ratio of C2 orientation against the temperature of liquid crystals.

The results show that the appearance ratio of C2 orientation of the liquid crystal cell 1 varies in response to a change in temperature of the liquid crystal cell 12 as shown in Table 2 and FIG. 6. Therefore, by heat-treating the liquid crystal cell 1 such that the temperature of the liquid crystal 12 is heated within a range of from $T_p$ (69° C.) to a temperature (59° C.) 10° C. below $T_p$, the C2 orientation can be achieved at or almost at 100 percent.

TABLE 2

| TEMPERATURE OF LIQUID CRYSTAL (° C.) | APPEARANCE RATIO OF C2 ORIENTATION (%) |
|---|---|
| 69.000 | 100.000 |
| 68.000 | 100.000 |
| 66.000 | 100.000 |
| 64.000 | 100.000 |
| 63.000 | 100.000 |
| 61.000 | 98.000 |
| 59.000 | 98.000 |
| 57.000 | 40.000 |
| 55.000 | 10.000 |

TABLE 2-continued

| TEMPERATURE OF LIQUID CRYSTAL (° C.) | APPEARANCE RATIO OF C2 ORIENTATION (%) |
|---|---|
| 54.000 | 10.000 |
| 52.000 | 10.000 |

Therefore, for the liquid crystal material of the present invention, the C2 orientation appears on the entire surface of the portion subjected to an application of pressure of the liquid crystal cell 1 without defects in the above-defined temperature range.

As described, the described experiments have proved that by applying both heat and pressure simultaneously, irrespectively of liquid crystal materials of the liquid crystal cells 1 adopted in respective examples, the C2 orientation can be achieved for sure.

Comparative Example 1

In this comparative example, the liquid crystal cell 1 adopted in example 1 which is once heated to show an isotropic phase without applying pressure is cooled off. As a result, only C1 orientation appears and C2 orientation does not appear in the liquid crystal cell 1.

Comparative Example 2

In this comparative example, comparative example 1 is repeated with respect to the liquid crystal cell 1 adopted in example 5. Again, the C2 orientation does not appear in the liquid crystal cell 1.

LIQUID CRYSTAL CELL PREPARATION EXAMPLE 6

The liquid crystal cell 1 of this example differs from the liquid crystal cell 1 adopted in example 1 in the materials for the insulating films 5 and 7, and the alignment films 8 and 9. The liquid crystal cell 1 of this example is prepared in the following manner.

First, an electrode film 4 and an electrode film 6 are prepared with a thickness of 1,000 Å respectively on a pair of glass substrates 2 and 3, and the insulating films 5 and 7 are formed on the electrode films 4 and 6 so as to have a thickness of 1,200 Å. The insulating films 5 and 7 are formed in the following manner: After forming a film of a solvent of OCD (available from Tokyo Ohka Kogyo Co., Ltd.), i.e., $SiO_2$ by the spin coating method, the film is baked for 90 minutes at 450° C.

Next, the alignment films 8 and 9 are respectively formed on the insulating films 5 and 7 with a thickness of 500 Å. The insulating films 8 and 9 are formed in the following manner: After forming a film of a solvent of X007 (available from Chisso Co.), i.e., polyamide carboxylic acid (polyamic acid) by the spin coating method, the film is baked for 90 minutes at 200° C. The electrode substrates 10 and 11 of the this example are formed in the described manner.

Next, the rubbing treatment is applied to the electrode substrates 10 and 11 under the following conditions:

Diameter of Rubbing Roller: 150 mm

Number of Revolutions per Minute of Rubbing Roller: 500 rpm

Moving Rate of Stage: 10mm/s

Number of Repeated Times of Rubbing: 3 times.

Depth of Deformed Region of Rubbing Cloth: 0.2 mm

Further, the electrode substrates 10 and 11 are laminated in such a manner that respective rubbing directions are identical, thereby forming a liquid crystal cell 1 (parallel rubbing cell) shown in FIG. 2. The described cell gap of the liquid crystal cell 1 is set in a range of from 1.0 to 1.5 μm. For the liquid crystal 12 to be sealed in the liquid crystal cell 1, a liquid crystal material which shows the following phase transition temperature is adopted:

With respect to the liquid crystal cell 1 prepared in the described manner, a pressure is applied in the same manner as example 2 except that the heating temperature of the liquid crystal cell 1 is changed to 62° C.

As a result, a C2 orientation appears on the entire surface of the portion subjected to an application of pressure with respect to the described liquid crystal material adopted in the liquid crystal cell 1.

Comparative Example 3

In this comparative example, the process of comparative example 1 is repeated with respect to the liquid crystal cell 1 adopted in Example 6. However, the C2 orientation does not appear in the liquid crystal cell 1.

As described, by applying both heat and pressure to the liquid crystal material simultaneously, in the liquid crystal element which is cooled off after the described process is applied, a C2 orientation appears in the portion subjected to an application of pressure. Therefore, irrespectively of the kinds of materials for the liquid crystal, the insulating film and the alignment film, the C2 orientation always appears in the liquid crystal display element. Additionally, by arranging such that the portion subjected to an application of pressure of the liquid crystal cell 1 be moved in an opposite direction to the rubbing direction, the C2 orientation can be achieved always at high yield under applied heating temperature, thereby achieving a still improved display quality of the liquid crystal cell 1.

Moreover, as the liquid crystal material shows a ferroelectricity, the ferroelectric liquid crystal display element which always shows the C2 orientation can be achieved, thereby providing a ferroelectric liquid crystal display element which offers a stable display quality.

In the described arrangement, the SmC* phase liquid crystal material which shows the SmC* phase is adopted as the liquid crystal material, and the SmC* phase liquid crystal material is heated within the temperature range of from a temperature 10° C. below the phase transition temperature at which a transition in phase occurs from the SmA phase to the SmC* phase to the phase transition temperature, whereby the rate of appearance of C2 orientation of 100% or almost 100 % can be achieved, thereby providing the liquid crystal display element which offers an excellent quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of aligning liquid crystals, designed for aligning a liquid crystal material of a liquid crystal display element, said liquid crystal material sealed between a pair of planar light-transmissive substrates respectively having alignment films formed on surfaces thereof which face each other, comprising the step of:

locally applying a pressure to said liquid crystal material under an applied heat in order to align the liquid crystal material, said locally applied pressure being applied to the planar light-transmissive substrates,     wherein a portion subjected to an application of pressure in said liquid crystal material is moved in an opposite direction to a direction of an alignment treatment applied to said alignment films.

2. The method for aligning liquid crystals as set forth in claim 1, wherein:

said liquid crystal material is a ferroelectric liquid crystal material.

3. The method for aligning liquid crystals as set forth in claim 1, wherein:

said liquid crystal material is a ferroelectric liquid crystal material.

4. The method for aligning liquid crystals as set forth in claim 3, wherein:

said liquid crystal material is a SmC* phase liquid crystal material having a SmC* phase, and     said SmC* phase liquid crystal material is heated at temperature ranging from a temperature 10° C. below a phase transition temperature, at which a transition in phase occurs from a SmA phase to a SmC* phase, to the phase transition temperature.

5. A liquid crystal alignment device for aligning a liquid crystal material of a liquid crystal display element, said liquid crystal material being sealed between a pair of planar light-transmissive substrates respectively having alignment films formed on surfaces thereof which face each other, comprising:

heat application means for heating said liquid crystal material;

pressure application means for locally applying a pressure onto said liquid crystal material under an applied heat by said heat application means in order to align the liquid crystal material, said locally applied pressure being applied to the planar light-transmissive substrates; and     moving means for moving a portion subjected to an application of pressure of said liquid crystal material in an opposite direction to a direction of an alignment treatment applied to said alignment films.

6. The liquid crystal alignment device as set forth in claim 5, wherein:

said liquid crystal material is a SmC* phase liquid crystal material,     said heating means is permitted to set a heating temperature such that said SmC* phase liquid crystal material is heated within a temperature range of from a temperature 10° C. below a phase transition temperature at which a transition in phase occurs from a SmA phase to a SmC* phase, to the phase transition temperature.

7. The liquid crystal alignment device as set forth in claim 5, wherein:

said pressure application means is at least one roller provided at a fixed position; and     said moving means is a stage for placing thereon said liquid crystal display element, and moving said liquid crystal display element in the same direction as a direction of an alignment treatment applied to said alignment films.

8. The liquid crystal alignment device as set forth in claim 7, wherein:

said roller is freely rotatable.

9. The liquid crystal alignment device as set forth in claim 7, wherein:

said roller is fixed.

10. The liquid crystal alignment device as set forth in claim 9, further comprising:

cooling means for cooling off said roller that is heat treated by said heat application means.

11. The liquid crystal alignment device as set forth in claim 10, wherein:

said cooling means supplies a cooling water to a hollow space which penetrates both ends of said roller.

12. The liquid crystal alignment device as set forth in claim 7, wherein:

said roller is made of stainless steel, and is covered with a protective film.

13. The liquid crystal alignment device as set forth in claim 7, wherein:

said roller has a length which is longer than a length between both ends of a display area in said liquid crystal display element in a lengthwise direction of said roller and is shorter than a length between both ends of said liquid crystal display element.

14. The liquid crystal alignment device as set forth in claim 5, wherein:

said pressure application means and said moving means are rollers which move in an opposite direction to a direction of an alignment treatment applied to said alignment films.

15. The liquid crystal alignment device as set forth in claim 14, wherein:

said roller is freely rotatable.

16. The liquid crystal alignment device as set forth in claim 14, wherein:

said roller is fixed.

17. The liquid crystal alignment device as set forth in claim 14, wherein:

said roller is made of stainless steel, and is covered with a protective film.

18. The liquid crystal alignment device as set forth in claim 14, wherein:

said roller has a length which is longer than a length between both ends of a display area in said liquid crystal display element in a lengthwise direction of the roller and is shorter than a length between both ends of said liquid crystal display element.

19. The liquid crystal alignment device as set forth in claim 14, further comprising:

cooling means for cooling off said roller that is heat treated by said heat application means.

20. The liquid crystal alignment device as set forth in claim 19, wherein:

said cooling means supplies a cooling water to a hollow space which penetrates both ends of said roller.

21. A liquid crystal alignment device for aligning a liquid crystal material of a liquid crystal display element, said liquid crystal material being sealed between a pair of planar light-transmissive substrates respectively having alignment films formed on surfaces thereof which face each other, comprising:

a heater for heating said liquid crystal material;

a pressurizer for locally applying a pressure onto said liquid crystal material under an applied heat by said heater in order to align the liquid crystal material, said locally applied pressure being applied to the planar light-transmissive substrates; and a moving mechanism for moving a portion subjected to an application of pressure of said liquid crystal material in an opposite direction to a direction of an alignment treatment applied to said alignment films.

22. A liquid crystal alignment device for aligning a liquid crystal material of a liquid crystal display element, said liquid crystal material being sealed between a pair of planar light-transmissive substrates respectively having alignment films formed on surfaces thereof which face each other, comprising:

a heater for heating said liquid crystal material; and a pressurizer for locally applying a pressure onto said liquid crystal material under an applied heat by said heater in order to align the liquid crystal material, said locally applied pressure being applied to the planar light-transmissive substrates, wherein said liquid crystal material is a SmC* phase liquid crystal material, and said heater is permitted to set a heating temperature such that said SmC* phase liquid crystal material is heated within a temperature range of from a temperature 10° C. below a phase transition temperature at which a transition in phase occurs from a SmA phase to a SmC* phase, to the phase transition temperature.

23. A liquid crystal display element including a liquid crystal material sealed between a pair of planar light-transmissive substrates respectively having alignment films formed on surfaces thereof which face each other, wherein:

said liquid crystal material is locally subjected to an application of pressure under an applied heat in order to align the liquid crystal material, said locally applied pressure being applied to the planar light-transmissive substrates, and in a process of locally applying a pressure to said liquid crystal material, the portion subjected to an application of pressure of said liquid crystal material is moved in an opposite direction to a direction of an alignment treatment applied to said alignment films.

24. The liquid crystal display element as set forth in claim 23, wherein:

said liquid crystal material shows ferroelectricity.

25. The liquid crystal display element as set forth in claim 23, wherein:

said liquid crystal material shows ferroelectricity.

26. The liquid crystal display element as set forth in claim 23, wherein:

said liquid crystal material shows ferroelectricity.

27. The liquid crystal display element as set forth in claim 26, wherein:

said liquid crystal material shows a SmC* phase, and a heating temperature is set within a range of from a temperature 10° C. below a phase transition temperature at which a transition in phase occurs from a SmA phase to a SmC* phase, to the phase transition temperature.

* * * * *

UNITED STATES PATENT AND TRADEMARK OFFICE
CERTIFICATE OF CORRECTION

PATENT NO. : 6,295,112 B1
DATED : September 25, 2001
INVENTOR(S) : Masaaki Kabe et al.

It is certified that error appears in the above-identified patent and that said Letters Patent is hereby corrected as shown below:

<u>Title page,</u>
Item [75], delete "Takashi Kaneko and Mitsuhiro Shigeta"

Signed and Sealed this

Twenty-eighth Day of May, 2002

Attest:

JAMES E. ROGAN
*Director of the United States Patent and Trademark Office*

*Attesting Officer*